UNITED STATES PATENT OFFICE.

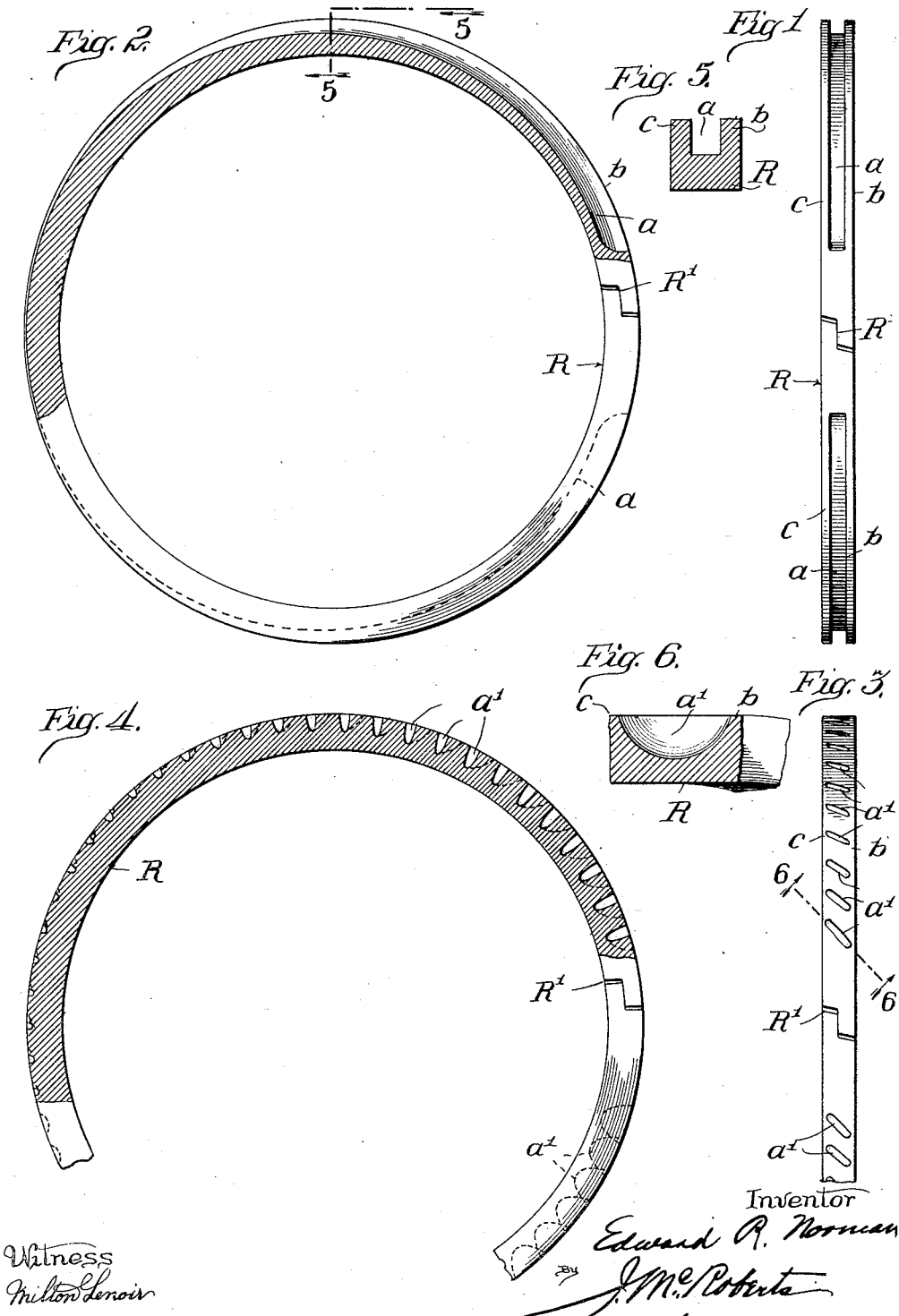

EDWARD R. NORMAN, OF CHICAGO, ILLINOIS.

PACKING-RING.

1,378,894.  Specification of Letters Patent.  Patented May 24, 1921.

Application filed November 28, 1917. Serial No. 204,312.

*To all whom it may concern:*

Be it known that I, EDWARD R. NORMAN, a citizen of the United States, residing at Chicago, in the county of Cook and State of Illinois, have invented certain new and useful Improvements in Packing-Rings, of which the following is a specification, reference being had therein to the accompanying drawing.

My invention relates to piston rings, and consists in the matters hereinafter set forth and pointed out in the appended claim.

In the drawings,

Figure 1 is a face view of a piston ring constructed according to my invention.

Fig. 2 is a circumferential central sectional view of the same;

Fig. 3 is a view similar to Fig. 1 and showing a different form of peripheral channeling, Fig. 4 is a view similar to Fig. 2 of the ring of Fig. 3 and Figs. 5 and 6 are cross sectional views, the latter being on the line 6—6 of Fig. 3.

The ring R is made from a suitable metallic blank of approximately the same thickness or size in cross-section throughout its extent and which is split and provided at its ends with a joint R' of any approved construction. When such a ring is closed, as to fit the contour of the walls of a retaining cylinder, it is of circular form, and as circular rings do not exert even wall pressure but exert greater pressure at its ends adjacent its joint than at its body portion opposite the joint, I channel its periphery or outer surface so that the ring acts as does an eccentric ring, this is to say one having a reduced mass of metal in its ends so that the radial pressure of the ends against the cylinder walls is substantially the same as the pressure of that part of the ring opposite the joint. I accomplish this by channeling the periphery of the ring eccentrically so that the channel will be deepest near the ends at the joint and will gradually decrease or grow shallower toward the opposite portion and preferably will not merge with the periphery of the ring opposite the joint. In the form shown in Figs. 1 and 2 this is accomplished by cutting a continuous groove *a* in the periphery which is deepest near the ends and grows shallower toward the opposite side of the ring; and in the form shown in Figs. 3 and 4 it is accomplished by cutting a series of separate diagonal grooves *a'* in the periphery which are preferably of uniform length and width but are shallow opposite the joint and grow deeper toward the ends. In each case the channeling does not extend circumferentially to the ends of the ring and does not extend radially or transversely to the sides of the ring, but terminates in both directions within the body of the ring, the margins of the channeling being equidistant from the edges of the ring, and the width of the channeling being one-half the width of the ring or equal to the combined width of the marginal ribs *b* and *c*. By my invention the pressure of the ring on the wall of an associated channel is uniform throughout its circumference, and the friction between the ring and cylinder wall is reduced by reducing the contact area between these parts and providing oil pockets where the reduction of contact occurs.

I claim:—

A one-piece packing ring of uniform radial thickness throughout and having a joint formed by its meeting ends and an eccentric channel in its outer surface terminating short of the meeting ends and being deeper near the joint than in the other portions of ring and providing the concentric ring with an outer oil groove and with the equal radial pressure of the eccentric type of ring.

In testimony whereof I affix my signature in presence of two witnesses.

EDWARD R. NORMAN.

Witnesses:
AMOS B. WHITTLE,
J. McROBERTS.